United States Patent
Liu et al.

(10) Patent No.: US 7,682,524 B2
(45) Date of Patent: Mar. 23, 2010

(54) PHOSPHOR FOR PRODUCING WHITE LIGHT UNDER EXCITATION OF UV LIGHT AND METHOD FOR MAKING THE SAME

(75) Inventors: Ru-Shi Liu, Jhongli (TW); Ivan Baginskiy, Jhongli (TW); Ting-Shan Chan, Jhongli (TW); Jeng-Yang Chang, Jhongli (TW)

(73) Assignee: National Central University, Taoyuan (TW)

( * ) Notice: Subject to any disclaimer, the term of this patent is extended or adjusted under 35 U.S.C. 154(b) by 302 days.

(21) Appl. No.: 11/768,906

(22) Filed: Jun. 27, 2007

(65) Prior Publication Data

US 2009/0001318 A1 Jan. 1, 2009

(51) Int. Cl.
*C09K 11/59* (2006.01)
*C09K 11/55* (2006.01)

(52) U.S. Cl. ............................................. 252/301.4 F
(58) Field of Classification Search ............ 252/301.4 F
See application file for complete search history.

(56) References Cited

U.S. PATENT DOCUMENTS 6,621,211 B1 9/2003 Srivastava et al.
6,809,347 B2 10/2004 Tasch et al.
6,812,500 B2 11/2004 Reeh et al.

FOREIGN PATENT DOCUMENTS

EP          1138747 A2      4/2001
KR       2003060697    *    7/2003

OTHER PUBLICATIONS

Derwent abstract for KR 2003060697, published Jul. 16, 2003.*

* cited by examiner

*Primary Examiner*—C. Melissa Koslow
(74) *Attorney, Agent, or Firm*—Chun-Ming Shih

(57) ABSTRACT

A phosphor material for producing white light under excitation of UV light and a method for making the same. The phosphor material is an alkaline-earth silicates compound with a chemical formula of $(A_{2-x-y}Ce_xEu_y)SiO_4$. A is one or more elements selected from the collection of Ba, Sr and Ca alkaline-earth metals. The range of x and y correspond to $0<x<1.0$ and $0<y\leqq0.5$ respectively. The phosphor material requires two rare earth elements: Ce and Eu. By blending the best co-doped composition of Ce and Eu ions, the single phosphor can directly produce white light under UV light excitation. In addition, the material in this invention is easy and fast to prepare in a large amount. Therefore, the phosphors can have a high industrial value.

3 Claims, 3 Drawing Sheets

PHOSPHOR FOR PRODUCING WHITE LIGHT UNDER EXCITATION OF UV LIGHT AND METHOD FOR MAKING THE SAME

FIELD OF THE INVENTION

The present invention relates to a phosphor composition for producing white light under excitation of ultraviolet (UV) light and a method for making the same, and more particularly to a phosphor powder of an alkaline-earth silicates compound characterized in that the phosphor powder of the alkaline-earth silicates compound concurrently includes two rare earth elements: cerium (Ce) and europium (Eu), and the best co-doped composition of Ce and Eu ions are blended, such that a single phosphor can produce white light directly under the excitation of UV light, and the method is simple and easy, and the phosphor material can be produced in a large quantity easily.

BACKGROUND OF THE INVENTION

The objective of research and development in the field of illumination light source of this century is to use a light emitting diode (LED) to produce a white light having a similar hue of sunlight to replace the white-light illumination of traditional fluorescent lamps. At present, single-chip white-light LED technology promoted all over the world primarily uses a blue-light LED chip that emits a wavelength of 440 nm~460 nm by exciting a yellow-light phosphor to produce white light. The method features the advantages of simple manufacturing process and low cost, but the white light produced by the method has the disadvantages of poor color saturation and color rendering.

In recent years, ultraviolet light emitting diode (UV-LED) chip that emits a wavelength of 360 nm~400 nm is used for exciting phosphors of three different colors: red (R), green (G) and blue (B), and these three colors can be mixed to form white light. The method features the advantages of high light emitting efficiency and color rendering as well as the UV-LED chip can work with various different phosphors, but the method has the disadvantages of damaging the products under the exposure of UV light for a long time and reducing the life expectancy of the chip, since the UV light has a short wavelength and the released energy is much higher than that of blue light or green light. In addition, it is necessary to mix several types of phosphors appropriately to control the quality of the white-light light source, and thus the research and development of the foregoing method and technology uses UV light to excite a single phosphor to produce white light, and the industrial value derived from such method and technology are immeasurable.

In the prior art, an alkaline-earth silicates compound is used as the main material, and phosphors applicable for the excitation of blue light or UV light have been disclosed in many issued patents including OSRAM's U.S. Pat. No. 6,812,500, General Electric's U.S. Pat. No. 6,621,211 and Toyota Gosei's U.S. Pat. No. 6,809,347, etc.

However, the foregoing patents come with a light emitting activator selected from a bivalent europium ($Eu^{2+}$) for radiating yellow-green as well as yellow to orange lights under the excitation of blue light or UV light. At present, there is no alkaline-earth silicates compound related patent that produces white light by exciting a phosphor material with UV light yet.

In addition, a patent related to the phosphor material of $A_{2-2x}Na_xE_xD_2V_3O_{12}$ as disclosed in General Electric's EP Pat. No. 1,138,747 similarly excites a single phosphor by UV light, but such patent selects a vanadates compound for the phosphor material.

SUMMARY OF THE INVENTION

In view of the aforementioned literatures and patents, the light emitting activator is selected from a bivalent europium ($Eu^{2+}$), and yellow-green as well as yellow to orange lights are radiated under the excitation of blue light or UV light. At present, there is no alkaline-earth silicate related patent that can produce white light by exciting a single phosphor material with uses UV light yet. Therefore, the inventors of the present invention based on years of experience in the related field to conduct extensive researches and experiments, and finally developed and invented a phosphor composition for producing white light under excitation of UV light and a method for making the same.

The present invention is to provide a phosphor composition for producing white light under excitation of UV light and a method for making the same, and the phosphor composition is a phosphor powder of an alkaline-earth silicates compound with a chemical formula of $(A_{2-x-y}Ce_xEu_y)SiO_4$, wherein A is one or more alkaline-earth metals selected from the collection of barium (Ba), strontium (Sr) and calcium (Ca), and x falls within a range of $0<x<1.0$, and y falls within a range of $0<y\leq0.5$. The present invention is characterized in that the phosphor powder of the alkaline-earth silicates compound must concurrently include two rare earth elements: cerium (Ce) and europium (Eu), and the best co-doped cerium (Ce) and europium (Eu) ions are used for exciting a single phosphor under UV light to produce white light directly. In addition, the material disclosed in the invention is easy and fast to prepare in a large amount, and thus having a high industrial value.

DETAILED DESCRIPTION OF THE PREFERRED EMBODIMENTS

Figure 1:
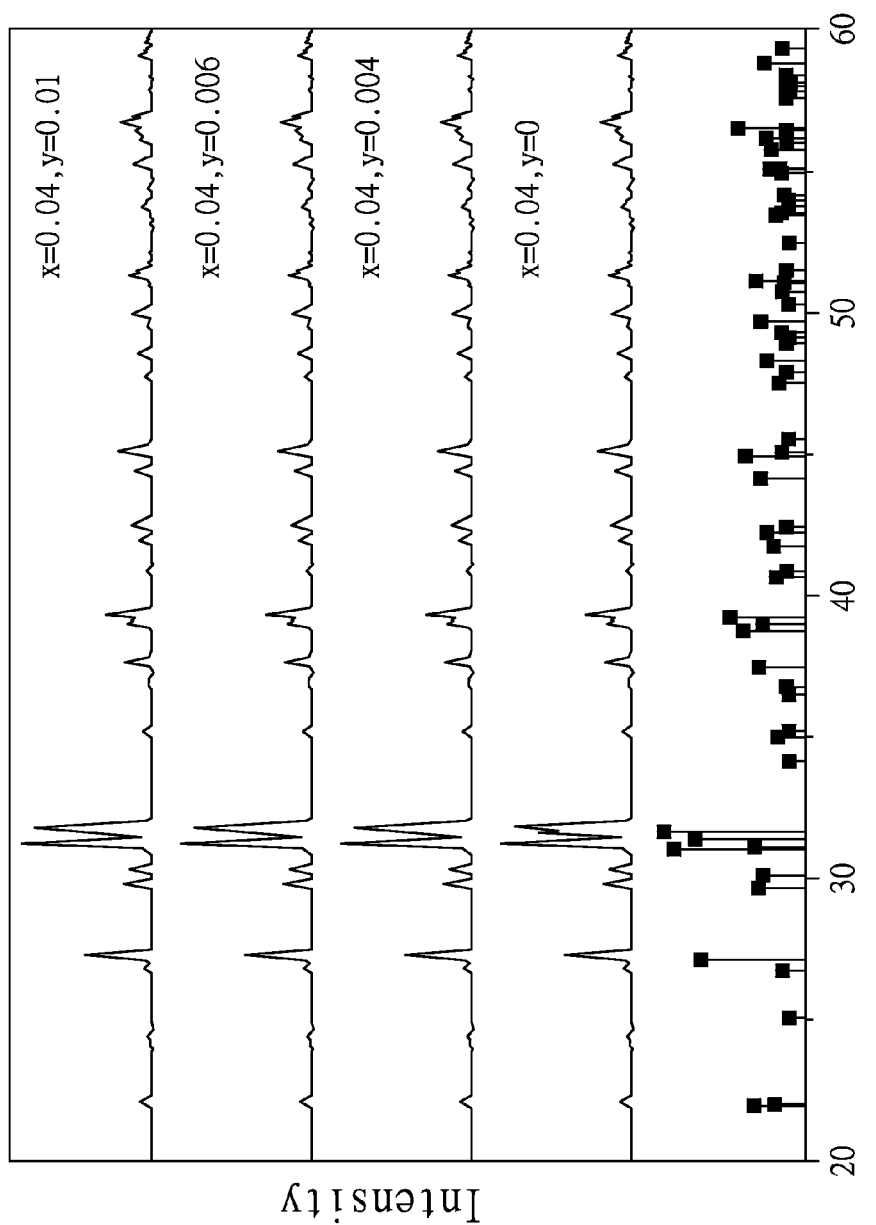
FIG. 1 shows X-ray diffraction patterns of the samples of $(Sr_2-x-yCe_xEu_y)SiO_4$ (x=0.04, y=0, 0.004, 0.006, 0.01) prepared in accordance with the present invention.

To make it easier for our examiner to understand the objective of the invention, its structure, innovative features, and performance, we use preferred embodiments together with the attached drawings for the detailed description of the invention.

The present invention discloses a phosphor composition for producing white light under excitation of UV light and a method for making the same, and the phosphor composition is an alkaline-earth silicates compound with a chemical formula of $(A_{2-x-y}Ce_xEu_y)SiO_4$, wherein A in the chemical formula is one or more alkaline-earth metals selected from the collection of barium (Ba), strontium (Sr) and calcium (Ca). In this preferred embodiment of the invention, the phosphor composition of the alkaline-earth silicates compound and the method of making the same will be described as follows, and $(Sr_{2-x-y}Ce_xEu_y)SiO_4$ is selected as the phosphor material for this preferred embodiment, wherein x falls within a range of $0<x\leq1.0$, and y falls within a range of $0<y\leq0.5$, and x=0.04, and y=0.01. The method for making the phosphor composition for producing white light under excitation of UV light in accordance with this preferred embodiment comprises the following steps:

1. Firstly, a first reactant containing strontium (Sr) such as strontium carbonate ($SrCO_3$), a second reactant containing silicon (Si) such as silicon dioxide ($SiO_2$) and a third reactant containing cerium (Ce) such as cerium dioxide ($CeO_2$) and a fourth reactant containing europium (Eu) such as europium trioxide ($Eu_2O_3$) are prepared according to a stoichiometric ratio to form $(Sr_{2-x-y}Ce_xEu_y)SiO_4$, wherein x=0.04, and y=0.01, and a solid state synthesis, a sol-gel process or a spray pyrolysis is used for the chemical combination.

2. After the reactants are mixed and ground thoroughly in a crucible, the uniformly mixed mixture is put into an aluminum oxide crucible, and then the aluminum oxide crucible is put into a square furnace and heated to 1100~1300° C. in an argon gas (Ar) environment with a temperature increase of 4° C./minute for 1~4 hours, and then the temperature is cooled to the room temperature at a cooling rate of 5° C./minute. In this embodiment, the mixture is sintered at 1250° C. for 2 hours, and then removed from the furnace and finally ground into powder.

3. The powder is put into an aluminum oxide crucible and heated under a reduction environment at 1100~1300° C. for 2~6 hours. In this embodiment, the mixture reduction environment having a mixture of hydrogen ($H_2$)/Nitrogen ($N_2$) in the ratio of 25%/75% is heated to 1250° C. at a temperature rise of 4° C./minute for the reduction, and then a constant temperature is maintained for 4 hours, and then cooled to the room temperature at a cooling rate of 5° C./minute. After the reduction and sintering processes are completed, the mixture is ground in a crucible into powders with uniform particulates to form a phosphor powder of a silicates compound $(Sr_{2-x-y}Ce_xEu_y)SiO_4$ (x=0.04, y=0.01).

Each of the foregoing reactants such as strontium carbonate ($SrCO_3$), silicon dioxide ($SiO_2$) and cerium dioxide ($CeO_2$) is a merchandise available easily in the market, and the reactant strontium carbonate ($SrCO_3$) can be substituted by the strontium nitrate $Sr(NO_3)_2$ or strontium oxide (SrO) or produced by oxidizing a strontium metal directly, and the reactant silicon dioxide ($SiO_2$) can be substituted by tetraethylorthosilicate (TEOS), and the reactant cerium dioxide ($CeO_2$) can be substituted by cerium nitrate ($Ce(NO_3)_3$) or cerium carbonate ($Ce_2(CO_3)_3$) or produced by oxidizing a cerium metal directly, and the reactant $Eu_2O_3$ can be substituted by $Eu(NO_3)_3 \cdot 5H_2O$ or produced by oxidizing a europium metal directly.

Referring to FIG. 1 for phosphor powder samples of silicate compounds $(Sr_{2-x-y}Ce_xEu_y)SiO_4$ (x=0.04, y=0, 0.004, 0.006, 0.01) prepared in accordance with the present invention, and the crystal purity is identified by a X-ray diffractometer. The samples are compared with the diffraction pattern of a standard strontium silicates compound (ICSD no: 35667), and it is found that the phosphor powder samples of the silicate compounds of the present invention is an orthorhombic structure without the occurrence of any phase change.

Figure 2:
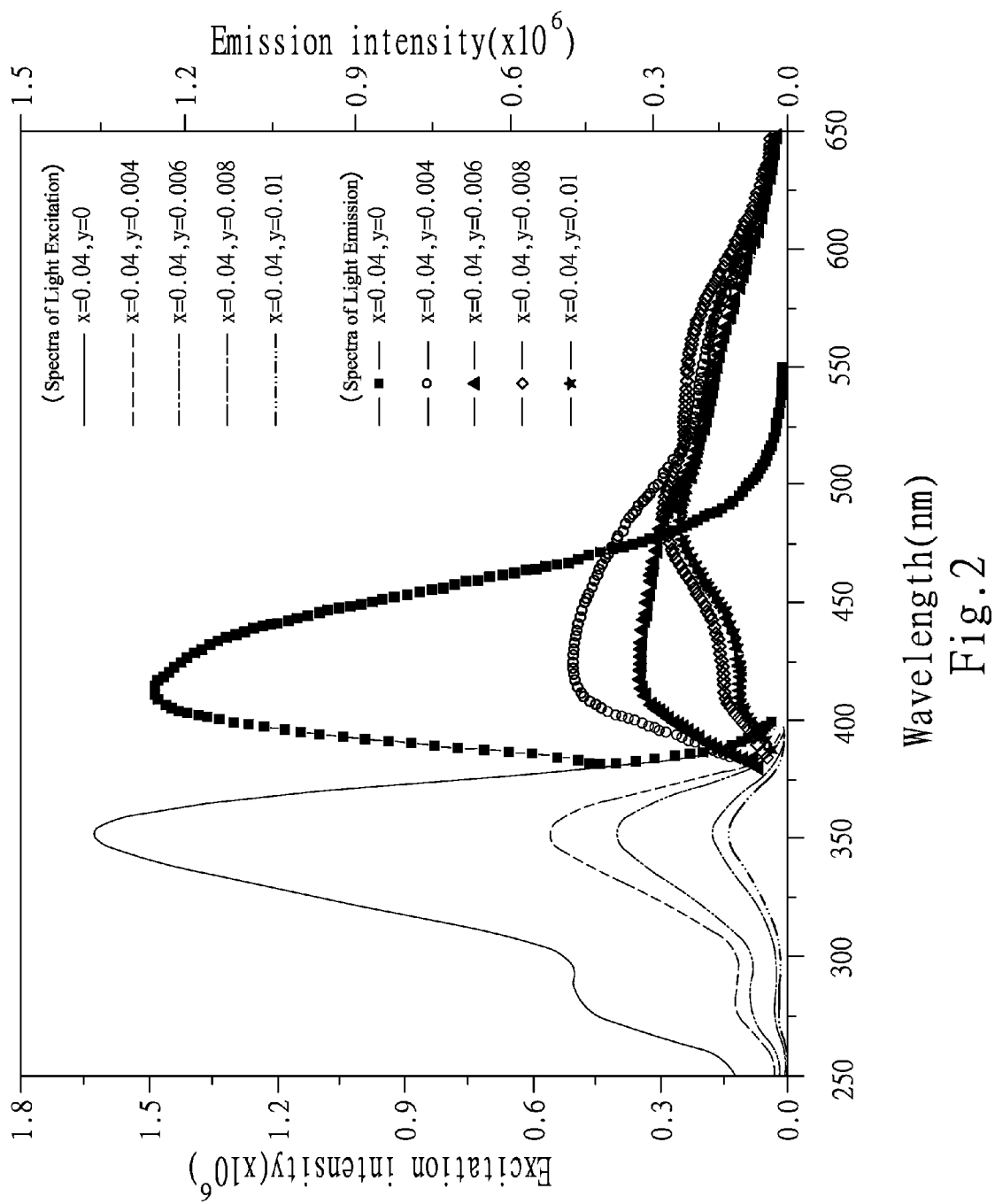
FIG. 2 shows spectra of a light excitation and a light emission of the samples of $(Sr_{2-x-y}Ce_xEu_y)SiO_4$ (x=0.04, y=0, 0.004, 0.006, 0.08, 0.01) prepared in accordance with the present invention, wherein the selected wavelength for the excitation is 370 nm.

Referring to FIG. 2 for spectra of a light excitation and a light emission of the samples of $(Sr_{2-x-y}Ce_xEu_y)SiO_4$ (x=0.04, y=0, 0.004, 0.006, 0.08, 0.01) prepared in accordance with the present invention, the phosphor material is applicable for the excitation of UV light, and the wavelength of the excitation source falls within a range of 250 nm~400 nm, and preferably 370 nm as adopted in the embodiment. From the spectroscope, the maximum emissive wavelength of the phosphor powder of the silicates compound $(Sr_{2-x-y}Ce_xEu_y)SiO_4$ (x=0.04, y=0) is 410 nm, and the phosphor powder is a blue-light phosphor powder, and the UV light is produced by a light emitting diode or plasma. Further, the wavelength of the emitted blue light falls within a range of 410 nm~470 nm.

If the concentration of cerium ($Ce^{3+}$) ions is maintained at 0.04, the emission peak is formed gradually at 556 nm as the doped concentration of the europium ($Eu^{2+}$) ion sensitizer increases from y=0 to y=0.01, and the intensity of cerium ($Ce^{3+}$) ions at the excitation peak of 370 nm drops gradually. The occurrence of this phenomenon is due to a portion of the energy released from the cerium ($Ce^{3+}$) ions after the cerium ($Ce^{3+}$) ions absorb the UV light, and such portion of energy will be transmitted to excite the europium ($Eu^{2+}$) ions to an excited state, and the europium ($Eu^{2+}$) ions will return to a ground state after the light is emitted, such that a yellow-green light of 556 nm is emitted. Since the spectra covers the wavelength of blue light and yellow-green colors with a complementary wavelength function, therefore the UV light can be used to excite a single phosphor to produce white light, if the doped concentration of europium ($Eu^{2+}$) ions increases gradually to y=0.008~0.01.

In summation of the description above, the best co-doped cerium (Ce) and europium (Eu) ions produce the best intensity for the emitted white light, when x=0.04 and y=0.008~0.01.

Figure 3:
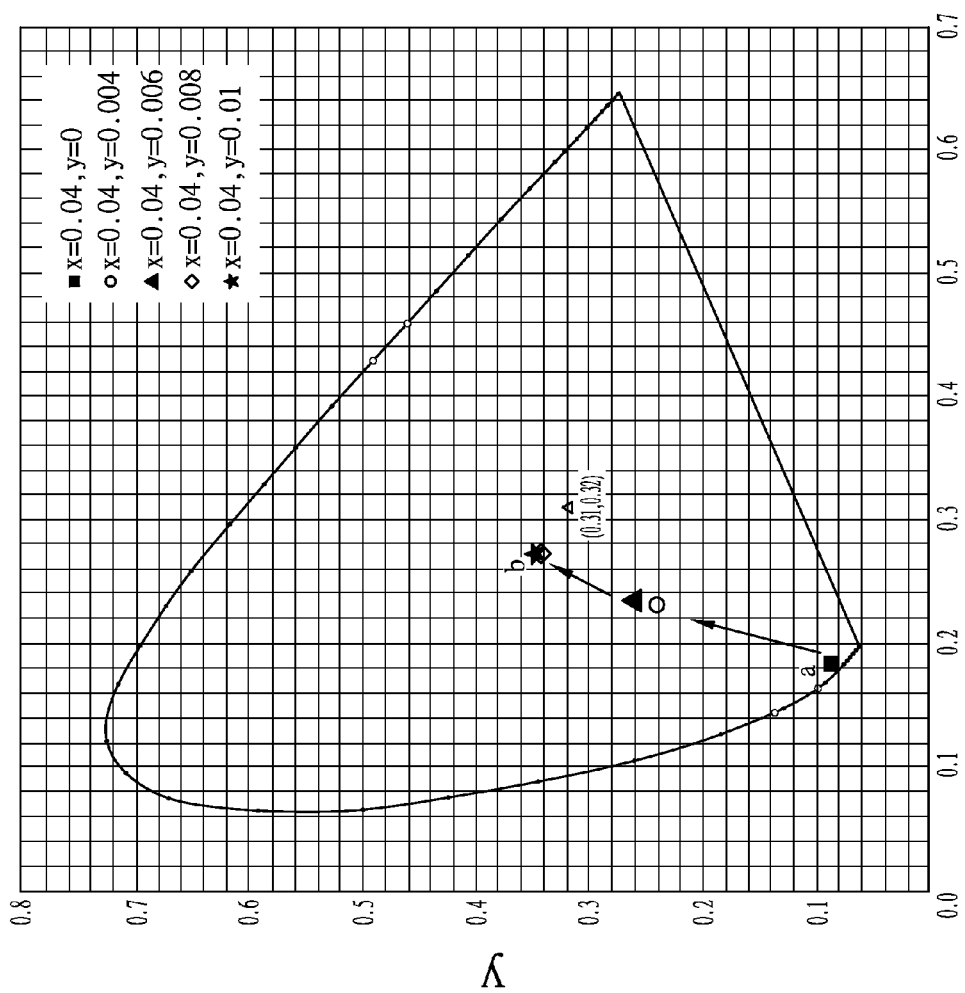
FIG. 3 shows CIE chromaticity coordinates converted from a light emission spectrum of the samples of $(Sr_{2-x-y}Ce_xEu_y)SiO_4$ (x=0.04, y=0, 0.004, 0.006, 0.08, 0.01) as depicted in FIG. 2 by using a conversion program.

Referring to FIG. 3 for a chromaticity diagram of the data of the emissive spectra converted by a conversion formula established by the Commission International de l, Eclairage (CIE) chromaticity coordinates in 1931, the emission spectra of the phosphor powder of a sample of the silicates compound $(Sr_{2-x-y}Ce_xEu_y)SiO_4$ (x=0.04, y=0) at a point in FIG. 2 is converted into simulated chromaticity coordinates (0.1554, 0.0312) of point a, and the triangular symbol indicates the theoretical white-light position (0.31, 0.32). From the position indicated in the spectroscope, the concentration of doped europium ($Eu^{2+}$) ions is increased from y=0 to y=0.01, and the chromaticity coordinates (indicated by the arrow in the figure) tend to move gradually towards the coordinates (0.2654, 0.3593) of Point b, and thus it shows that the phosphor material produced in accordance with this preferred embodiment of the invention is situated at coordinates very close to the coordinates of a white light and it has excellent color saturation.

In summation of the description above, the present invention herein enhances the performance than the conventional structure and further complies with the patent application requirements and is duly submitted for patent application.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making a phosphor composition for producing white light under excitation of ultraviolet light, comprising the steps of:

mixing a first reactant containing strontium (Sr), a second reactant containing silicon (Si), a third reactant containing cerium (Ce) and a fourth reactant containing europium (Eu) into a mixture;

heating the mixture in an argon gas environment at 1100~1300° C. for 1~4 hours to form an alkaline-earth silicates precursor; and heating the alkaline-earth silicates precursor in a reduction environment having a mixture of hydrogen ($H_2$)/Nitrogen ($N_2$) at 1100~1300° C. for 2~6 hours to form a phosphor powder of an alkaline-earth silicates compound.

2. The method for making a phosphor composition for producing white light under excitation of ultraviolet light as recited in claim 1, wherein the mixture in the argon gas environment is heated to 1100~1300° C. by a temperature increase of 4° C./minute.

3. The method for making a phosphor composition for producing white light under excitation of ultraviolet light as recited in claim 1, wherein the alkaline-earth silicate precursor in the reduction environment is heated to 1100~1300° C. by a temperature increase of 4° C./minute.

* * * * *